Dec. 4, 1945.    M. G. BALES    2,390,050
PLATE AND BEARING ASSEMBLY
Filed Dec. 1, 1944
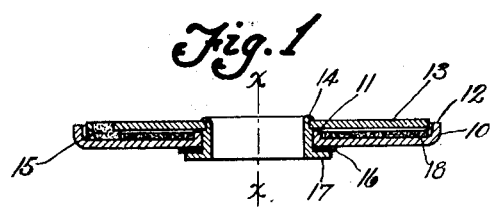
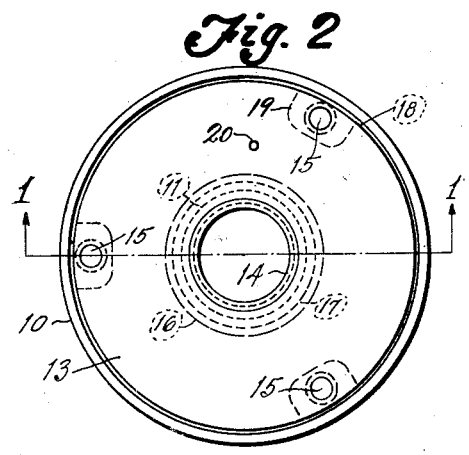
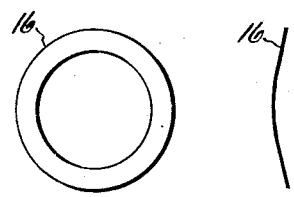
INVENTOR
MAX G. BALES
BY
Spencer Hardman & Fehr
his ATTORNEYS Patented Dec. 4, 1945

2,390,050

UNITED STATES PATENT OFFICE 2,390,050

PLATE AND BEARING ASSEMBLY

Max Gordon Bales, Anderson, Ind., assignor to General Motors Corporation, Detroit, Mich., a corporation of Delaware Application December 1, 1944, Serial No. 566,148

2 Claims. (Cl. 308—134.1)

This invention is concerned with the lubrication of the bearings by which an assembly of two metal plates are operatively connected for rotation of one plate relative to the other.

An object of the invention is to provide an assembly of metal plates, bearings by which one plate is supported by the other for rotation relative thereto, and bearing lubricating means requiring the minimum of attention.

Further objects and advantages of the present invention will be apparent from the following description, reference being had to the accompanying drawing, wherein a preferred embodiment of the present invention is clearly shown.

In the drawing:

Fig. 1 is a sectional view of the assembly embodying the invention on line 1—1 of Fig. 2.

Fig. 2 is a plan view of the assembly.

Figs. 3 and 4 are plan and edge views, respectively, of a resilient washer included in the assembly.

The assembly comprises a plate 10 having a central hole surrounded by a flange 11 and having a peripheral flange 12. Plate 13 which is supported by plate 10 for rotation relative thereto is attached to a bushing 14 of bearing metal journalled in the flange 11 of plate 10. Because the contacting surfaces of the bushing 14 and the flange 11 are relatively narrow in the direction of the axis x—x of the assembly, other means are provided to maintain the parallelism of the plates 10 and 13. For this purpose, the plate 13 carries porous metal discs or bearing buttons 15 for engaging the plate 10. The buttons 15, which equally space a plurality of portions of plate 13 from plate 10, are maintained in engagement with plate 10 by the pressure of a spring washer 16 located between plate 10 and a flange 17 of bushing 14.

Between the plates 10 and 13, there is located a felt washer 18 having notches 19 (Fig. 2) in which the buttons 15 are located. Through a hole 20 in plate 13, lubricating oil is introduced. Oil is absorbed by the washer 18 and unabsorbed oil is confined by the flanges of the plate 10. Oil creeps over the top of the flange 11 and down between the contacting surfaces of the flange 11 and bushing 14. Oil is fed to the porous metal buttons 15 along the upper surface of the plate 10 and also directly to the cylindrical sides of the buttons 15 when they contact with the washer 18 as the plate 13 is adjusted rotatively in relation to plate 10. Thus oil absorbed in the washer 18 as well as unabsorbed oil upon the plate 10 is absorbed as needed by the porous metal buttons 15 and provides a film of oil between the contacting surfaces of the buttons 15 and the plate 10.

One use of the assembly embodying the present invention is in an ignition timer such as shown, for example, in J. L. Arthur Patent #2,348,236. The plate 10 is to be fixed to the interior wall of a timer housing so that the axis x—x of the assembly coincides with the axis of a rotary timer-cam which operates a circuit breaker supported by the plate 13. The well-lubricated bearings of the assembly offer very small frictional resistance to the adjustment of the plate 13 relative to the plate 10 for the purpose of varying the timing of the ignition. The frictional resistance will remain small for a long time without additional oiling, because an adequate oil supply can be stored in the annular channel provided by the plate 10.

While the embodiment of the present invention as herein disclosed, constitutes a preferred form, it is to be understood that other forms might be adopted, all coming within the scope of the claims which follow.

What is claimed is as follows:

1. An assembly comprising a plate shaped to provide an annular channel between a peripherial flange and a flange surrounding a central hole, a second plate, a bearing bushing attached to second plate and journalled in the central flange of the first plate, porous metal bearing buttons attached to one plate and bearing on the other plate, spring means urging the plates toward each other, and a lubricant absorbing member located in said annular channel for supplying lubricant to the bearings.

2. An assembly of two plates, means for retaining them in assembled relation comprising centrally located interengaging bearing members provided respectively by said plates, a flange provided by one bearing member and spaced from the plate providing the other bearing member, spring means located in said space between said flange and said other bearing member for urging the plates toward each other, bearing buttons attached to one plate and urged against the other plate by said spring means, and a lubricant supply means located between said plates for supplying lubricant to said bearings.

MAX GORDON BALES.